United States Patent
Stoia et al.

(10) Patent No.: US 9,046,038 B2
(45) Date of Patent: Jun. 2, 2015

(54) COMBUSTOR

(75) Inventors: Lucas John Stoia, Taylors, SC (US); Patrick Benedict Melton, Horse Shoe, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 384 days.

(21) Appl. No.: 13/600,769

(22) Filed: Aug. 31, 2012

(65) Prior Publication Data

US 2014/0060078 A1  Mar. 6, 2014

(51) Int. Cl.
| F01D 25/28 | (2006.01) |
| F02C 7/20 | (2006.01) |
| F02C 3/14 | (2006.01) |
| F23R 3/10 | (2006.01) |
| F23R 3/28 | (2006.01) |

(52) U.S. Cl.
CPC . F02C 7/20 (2013.01); F01D 25/28 (2013.01); F02C 3/14 (2013.01); F23R 3/10 (2013.01); F23R 3/283 (2013.01)

(58) Field of Classification Search
CPC ............. F01D 25/28; F02C 3/14; F02C 7/20; F02C 7/22
USPC ..................... 60/737, 748, 740, 742, 800, 746
See application file for complete search history.

(56) References Cited

U.S. PATENT DOCUMENTS

| 6,334,310 B1 | 1/2002 | Sutcu et al. |
| 6,644,667 B2 | 11/2003 | Grondahl |
| 6,672,073 B2 | 1/2004 | Wiebe |
| 7,082,770 B2 | 8/2006 | Martling et al. |
| 7,926,283 B2 | 4/2011 | Byrne et al. |
| 2008/0034759 A1 | 2/2008 | Bulman et al. |
| 2009/0243230 A1* | 10/2009 | Myers et al. ................. 277/618 |
| 2010/0005803 A1 | 1/2010 | Tu et al. |
| 2010/0077761 A1 | 4/2010 | Johnson et al. |
| 2010/0132364 A1 | 6/2010 | Myers et al. |
| 2010/0242493 A1* | 9/2010 | Cihlar et al. .................... 60/796 |
| 2010/0300116 A1 | 12/2010 | Kaleeswaran et al. |
| 2011/0100016 A1 | 5/2011 | Cihlar et al. |

* cited by examiner

*Primary Examiner* — Phutthiwat Wongwian
*Assistant Examiner* — Marc J Amar
(74) *Attorney, Agent, or Firm* — Dority & Manning, PA

(57) ABSTRACT

A combustor includes a breech end, a plurality of fuel nozzles connected to the breech end and extending downstream from the breech end, and a shroud that circumferentially surrounds the plurality of fuel nozzles inside the combustor. A support extends radially inside at least a portion of the shroud. A leaf spring is between the support and one or more of the plurality of fuel nozzles, wherein each leaf spring includes at least three leaves.

20 Claims, 8 Drawing Sheets

COMBUSTOR

FIELD OF THE INVENTION

The present invention generally involves a combustor system and a method for supporting a fuel nozzle inside the combustor.

BACKGROUND OF THE INVENTION

Combustors are commonly used in industrial and power generation operations to ignite fuel to produce combustion gases having a high temperature and pressure. Various competing considerations influence the design and operation of combustors. For example, higher combustion gas temperatures generally improve the thermodynamic efficiency of the combustor. However, higher combustion gas temperatures also promote flame holding conditions in which the combustion flame migrates towards the fuel being supplied by nozzles, possibly causing accelerated wear to the nozzles in a relatively short amount of time. In addition, higher combustion gas temperatures generally increase the disassociation rate of diatomic nitrogen, increasing the production of nitrogen oxides ($NO_x$). Conversely, lower combustion gas temperatures associated with reduced fuel flow and/or part load operation (turndown) generally reduce the chemical reaction rates of the combustion gases, increasing the production of carbon monoxide and unburned hydrocarbons.

In a particular combustor design, an end cover or breach end connected to a combustor casing may define a combustor head end, and a cap assembly that extends radially across a portion of the combustor may separate the head end from a combustion chamber. One or more fuel nozzles connected to the breech end in a cantilevered fashion may extend downstream from the breech end to the cap assembly. The fuel nozzles may be radially arranged in the combustor head end to mix fuel with a working fluid prior to combustion in the combustion chamber.

Increasing an axial length and/or volume of the head end allows more time for the fuel and working fluid to mix prior to combustion. The enhanced mixing allows leaner combustion at higher operating temperatures to protect against flame holding while also controlling undesirable emissions. However, increasing the axial length and/or volume of the head end may lead to harmful combustion dynamics that reduce the useful life of one or more combustor components. For example, increasing the axial length of the head end may result in lower natural frequencies associated with the cantilevered fuel nozzles, leading to high cycle fatigue failure of the fuel nozzles and downstream components. Alternately, or in addition, the combustion dynamics may produce pressure pulses inside the fuel nozzles and/or combustion chamber that affect the stability of the combustion flame, reduce the design margins for flame holding, and/or increase undesirable emissions. Therefore, an improved system and method for supporting fuel nozzles inside a combustor that increases the natural or resonant frequencies created by the fuel nozzles, enhances flame stability, and/or reduces undesirable emissions would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor that includes a breech end, a plurality of fuel nozzles connected to the breech end and extending downstream from the breech end, and a shroud that circumferentially surrounds the plurality of fuel nozzles inside the combustor. A support extends radially inside at least a portion of the shroud. A leaf spring is between the support and one or more of the plurality of fuel nozzles, wherein each leaf spring includes at least three leaves.

Another embodiment of the present invention is a combustor that includes a breech end, a cap assembly that extends radially across at least a portion of the combustor, and a plurality of fuel nozzles connected to the breech end and extending downstream from the breech end through the cap assembly. A support extends radially inside at least a portion of the cap assembly. A leaf spring is between the support and one or more of the plurality of fuel nozzles, wherein each leaf spring includes at least three leaves.

In yet another embodiment of the present invention, a combustor includes a breech end, a plurality of fuel nozzles connected to the breech end and extending downstream from the breech end, and a shroud that circumferentially surrounds the plurality of fuel nozzles inside the combustor. A plate extends radially across at least a portion of the combustor inside the shroud, and a support extends radially across at least a portion of the combustor inside the shroud and upstream from the plate. A leaf spring is between the support and one or more of the plurality of fuel nozzles, wherein each leaf spring includes at least three leaves.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
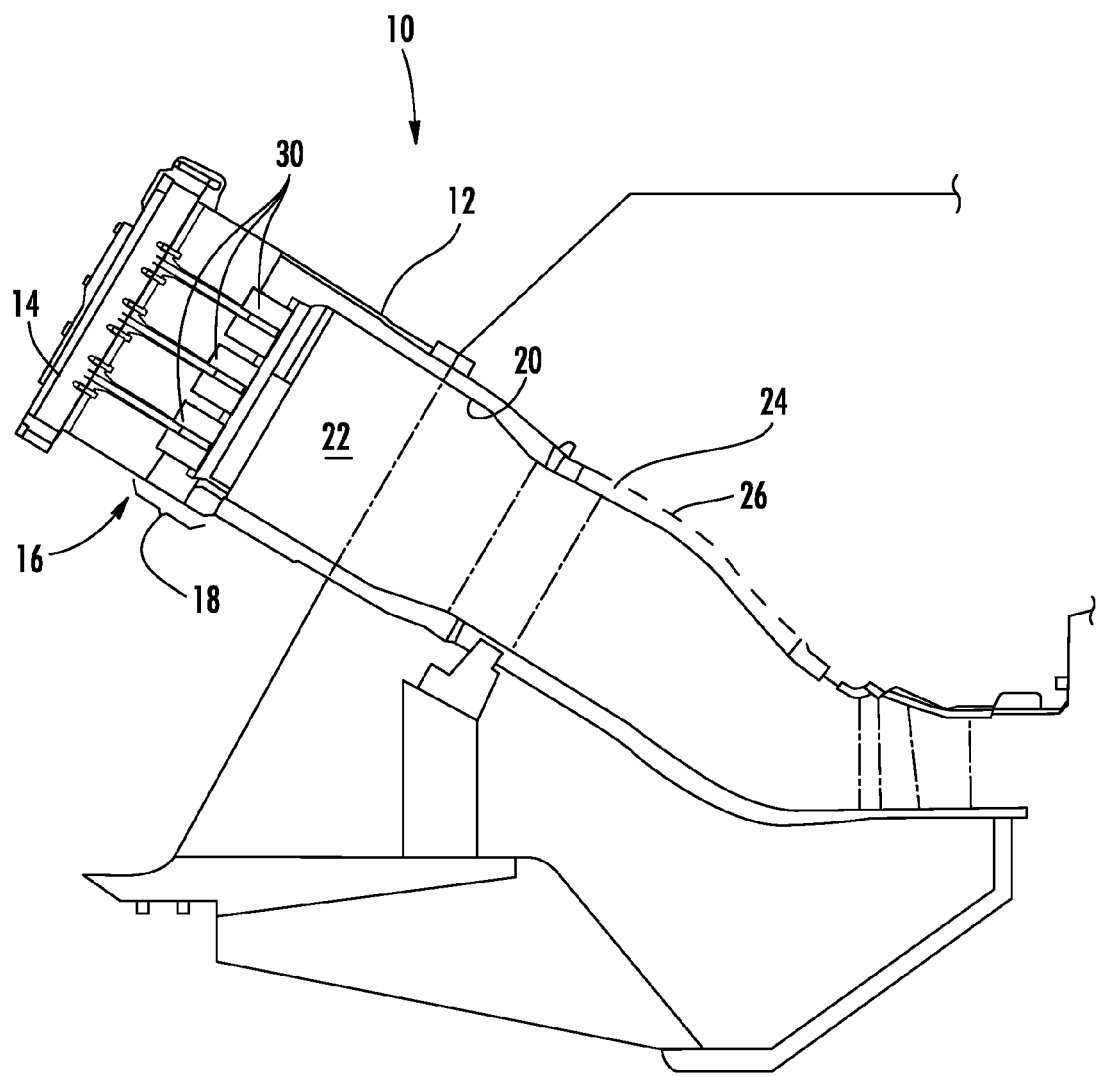
FIG. 1 is a side cross-section view of an exemplary combustor.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a combustor and a method for supporting a fuel nozzle in the combustor. The combustor generally includes one or more fuel nozzles cantilevered from an end cover or breech end of the combustor. A cap assembly circumferentially surrounds the fuel nozzles, and a support extends radially inside the cap assembly around one or more of the fuel nozzles. The support may be a solid or continuous structure and may include a plurality of flow holes for providing fluid communication through the support for cooling downstream components. One or more leaf springs and/or hula springs between the support and the fuel nozzles may brace the fuel nozzles radially to increase the natural or resonant frequencies of the fuel nozzles while also allowing relative axial movement between the fuel nozzles and the support and/or preventing fluid flow between the fuel nozzles and the support. Although exemplary embodiments of the present invention will be described generally in the context of a combustor incorporated into a gas turbine for purposes of illustration, one of ordinary skill in the art will readily appreciate that embodiments of the present invention are not limited to a gas turbine unless specifically recited in the claims.

FIG. 1 shows a simplified cross-section view of an exemplary combustor 10, such as would be included in a gas turbine, according to various embodiments of the present invention. The combustor 10 generally includes a casing 12 that circumferentially surrounds at least a portion of the combustor 10 to contain a working fluid flowing to the combustor 10. As shown in FIG. 1, the casing 12 may be connected to or include an end cover or breech end 14 that extends radially across at least a portion of the combustor 10 to provide an interface for supplying fuel, diluent, and/or other additives to the combustor 10. In addition, the casing 12 and breech end 14 may combine to at least partially define a head end 16 inside the combustor 10. A cap assembly 18 downstream from the head end 16 may extend radially across at least a portion of the combustor 10, and a liner 20 connected to the cap assembly 18 may at least partially define a combustion chamber 22 downstream from the head end 16. The working fluid may flow, for example, through flow holes 24 in an impingement sleeve 26 and along the outside of the liner 20 to provide convective cooling to the liner 20. When the working fluid reaches the head end 16, the working fluid reverses direction to flow through the cap assembly 18 and into the combustion chamber 22.

One or more fuel nozzles 30 may extend between the breech end 14 and the cap assembly 18. The fuel nozzles 30 may be radially arranged in the combustor head end 16 to mix fuel with the working fluid prior to combustion in the combustion chamber 22. As shown in FIG. 1, the fuel nozzles 30 may be connected to the breech end 14 in a cantilevered fashion, and the cantilevered attachment results in a resonant or natural frequency associated with the fuel nozzles 30 and/or cap assembly 18 that may be in the frequency range of other vibration sources, causing harmonic vibrations that may lead to damage and/or increased wear. As a result, various embodiments of the present invention include one or more supports that extend radially inside the cap assembly 18. The supports brace the fuel nozzles 30 to raise the resonant or natural frequency associated with the fuel nozzles 30 and/or cap assembly 18.

Figure 2:
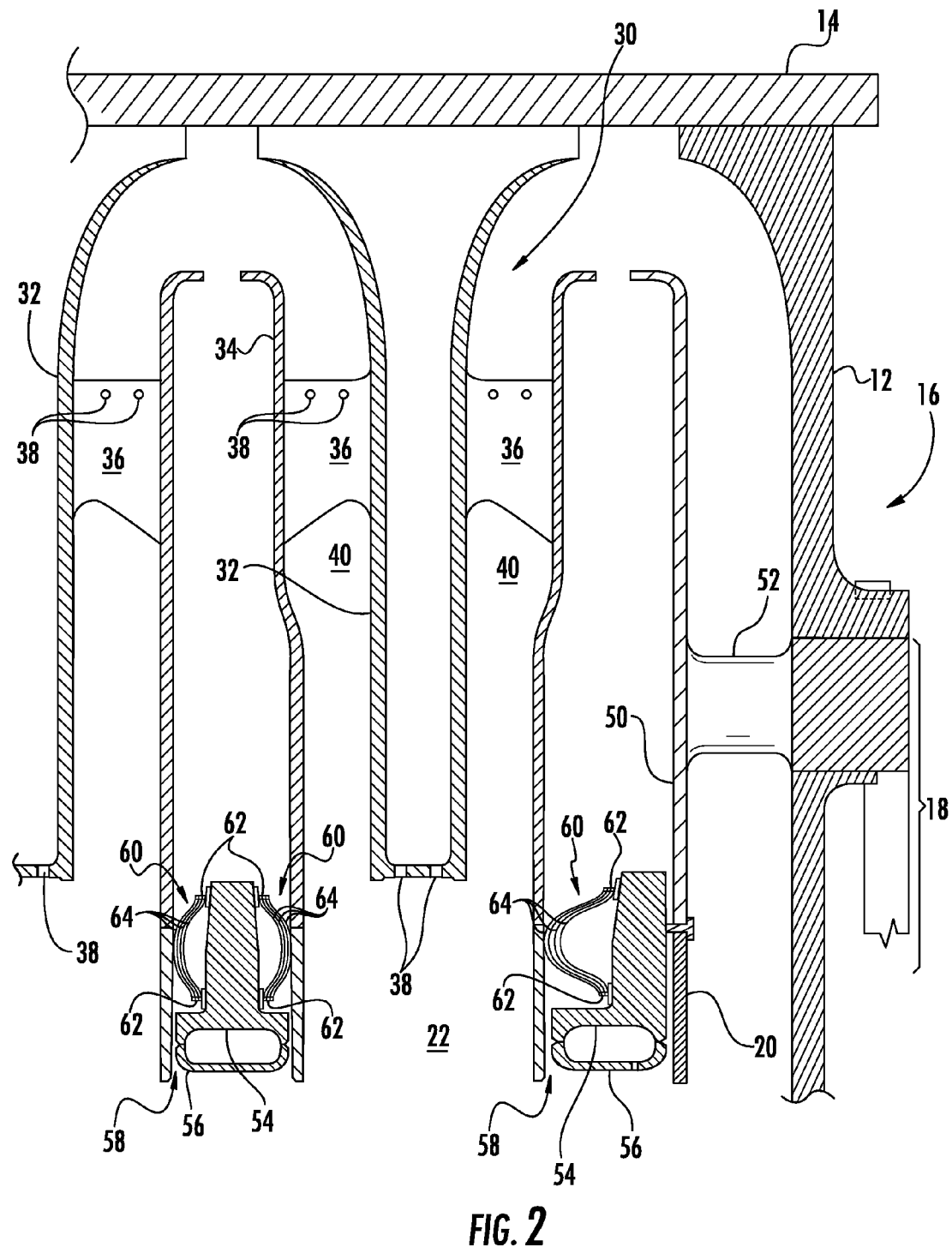
FIG. 2 is a side cross-section view of a portion of the head end of the combustor shown in FIG. 1 according to a first embodiment of the present invention.

FIG. 2 provides an enlarged side cross-section view of the head end 16 of the combustor 10 shown in FIG. 1 according to a first embodiment of the present invention. As shown in FIG. 2, each fuel nozzle 30 may include, for example, a center body 32, a shroud 34 that circumferentially surrounds at least a portion of the center body 32, and one or more vanes 36 that extend radially between the center body 32 and the shroud 34. The center body 32 provides fluid communication for fuel, diluents, and/or other additives to flow from the breech end 14, through the cap assembly 18, and into the combustion chamber 22. For example, fuel, diluents, and/or other additives may flow through the center body 32 and out fuel ports 38 at a downstream end of the center body 32 into the combustion chamber 22. The shroud 34 defines an annular passage 40 between the center body 32 and the shroud 34. The annular passage 40 provides fluid communication for the working fluid to flow through the cap assembly 18 and into the combustion chamber 22. In particular embodiments, the center body 32 may provide fluid communication to one or more of the vanes 36 so that fuel, diluents, and/or other additives may flow through fuel ports 38 in the vanes 36. The vanes 36 may be angled to impart swirl to the fuel and working fluid flowing through the annular passage 40 to enhance mixing between the fuel and working fluid before reaching the combustion chamber 22.

As shown in FIG. 2, the cap assembly 18 generally includes a shroud 50 that circumferentially surrounds the fuel nozzles 30, and one or more radially extending braces 52 may connect the cap assembly 18 to the casing 12. A support 54 inside the cap assembly 18 may extend radially inside at least a portion of the shroud 50, and a cap plate 56 may extend radially inside at least a portion of the shroud 50 downstream from the support 54. The support 54 and cap plate 56 may be fabricated from any suitable material capable of extended exposure to the temperatures associated with the combustor 10. For example, the support 54 and/or cap plate 56 may be machined from carbon steel, low alloy steel, stainless steel, or another suitable high strength sheet metal. The support 54 and/or cap plate 56 may be a single plate or structure or a combination of multiple plates or structures that extend radially inside the shroud 50 and around the fuel nozzles 30. As shown in FIG. 2, for example, the support 54 and cap plate 56 may be welded, brazed, press fit, or otherwise connected to the shroud 50 and may include a separate hole or passage 58 for each of the fuel nozzles 30. In this manner, the fuel nozzles 30 may extend from the breech end 14 downstream through the passages 58 in the support 54 and cap plate 56 to provide fluid communication from the end cover 14, through the cap assembly 18, and into the combustion chamber 22.

One or more leaf springs 60 between the support 54 and one or more of the fuel nozzles 30 may provide radial bracing to the fuel nozzles 30 to increase the natural or resonant frequencies of the fuel nozzles 30. As used herein, the term "leaf spring" includes any arc-shaped length of steel, alloy, or other suitable material capable of withstanding extended exposure inside the cap assembly 18 in which at least one of the ends and the arc of the leaf spring are directly or indirectly braced against opposing surfaces to provide a flexible coupling between the fuel nozzles 30 and the support 54. In particular embodiments, the leaf springs 60 may be fixedly connected to either or both of the fuel nozzles 30 and the support 54. In addition, one or more leaf springs 60 may be located at particular locations around individual fuel nozzles 30, or a single leaf spring 60 may extend continuously around the circumference of individual fuel nozzles 30. The number, thickness, and length of individual leaves in the leaf spring will vary according to particular embodiments. However, it has been found that in leaf springs 60 having comparable stiffness, leaf springs 60 with fewer and thicker leaves may be more susceptible to premature high cycle fatigue failure compared to leaf springs 60 having a higher number of thinner leaves. As a result, the leaf springs 60 may provide radial stiffness to the fuel nozzles 30 on the order of 30 klb/in to 150 klb/in, although the particular stiffness of the leaf springs 60 is not a limitation of the present invention unless specifically recited in the claims. In particular embodiments, the leaf springs 60 may also allow relative axial movement between the fuel nozzles 30 and the support 54 and/or prevent fluid flow between the fuel nozzles 30 and the support 54.

As shown in FIG. 2, the leaf springs 60 may flexibly brace the fuel nozzles 30 against the support 54. The support 54 in turn is rigidly connected to the shroud 50, and the brace 52 anchors or ties the shroud 50 to the casing 12. In this manner, the combined effect of the shroud 50, support 54, and leaf springs 60 may stiffen the fuel nozzles 30 radially, thereby increasing the natural frequency of the fuel nozzles 30 and/or cap assembly 18. In addition, the location and orientation of the support 54 and leaf springs 60 may facilitate assembly of the support 54 and leaf springs 60 around the fuel nozzles 30. Specifically, the leaf springs 60 may be bolted, welded, brazed, press-fit, or otherwise connected to the support 54, and the curvature and flexibility of the leaf springs 60 may facilitate sliding the support 54 over the shrouds 34 to sandwich the leaf springs 60 between the fuel nozzles 30 and the support 54. The support 54 may then be bolted, welded, brazed, press-fit, or otherwise attached to the shroud 50 before the cap plate 56 is similarly attached to complete installation of the cap assembly 18 in the combustor 10.

Figure 3:
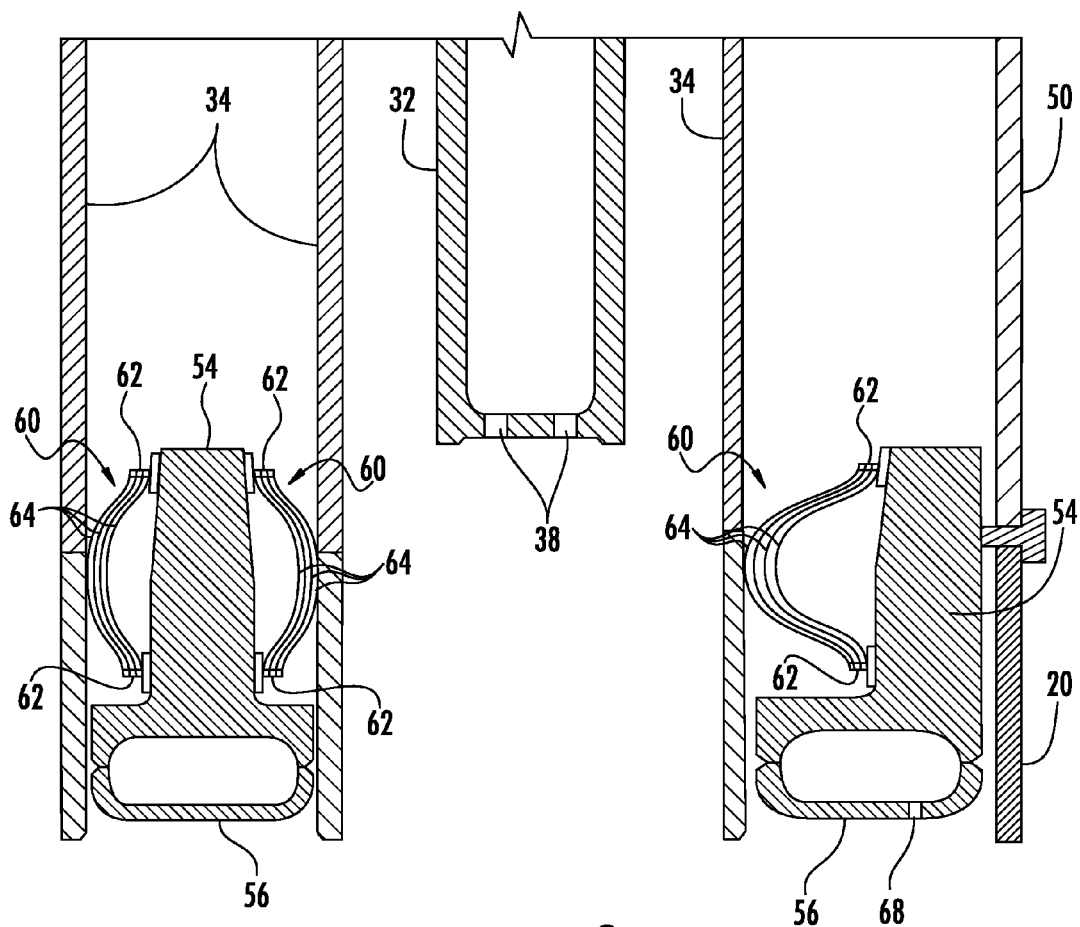
FIG. 3 is an enlarged side cross-section view of the leaf springs shown in FIG. 2.
Figure 4:
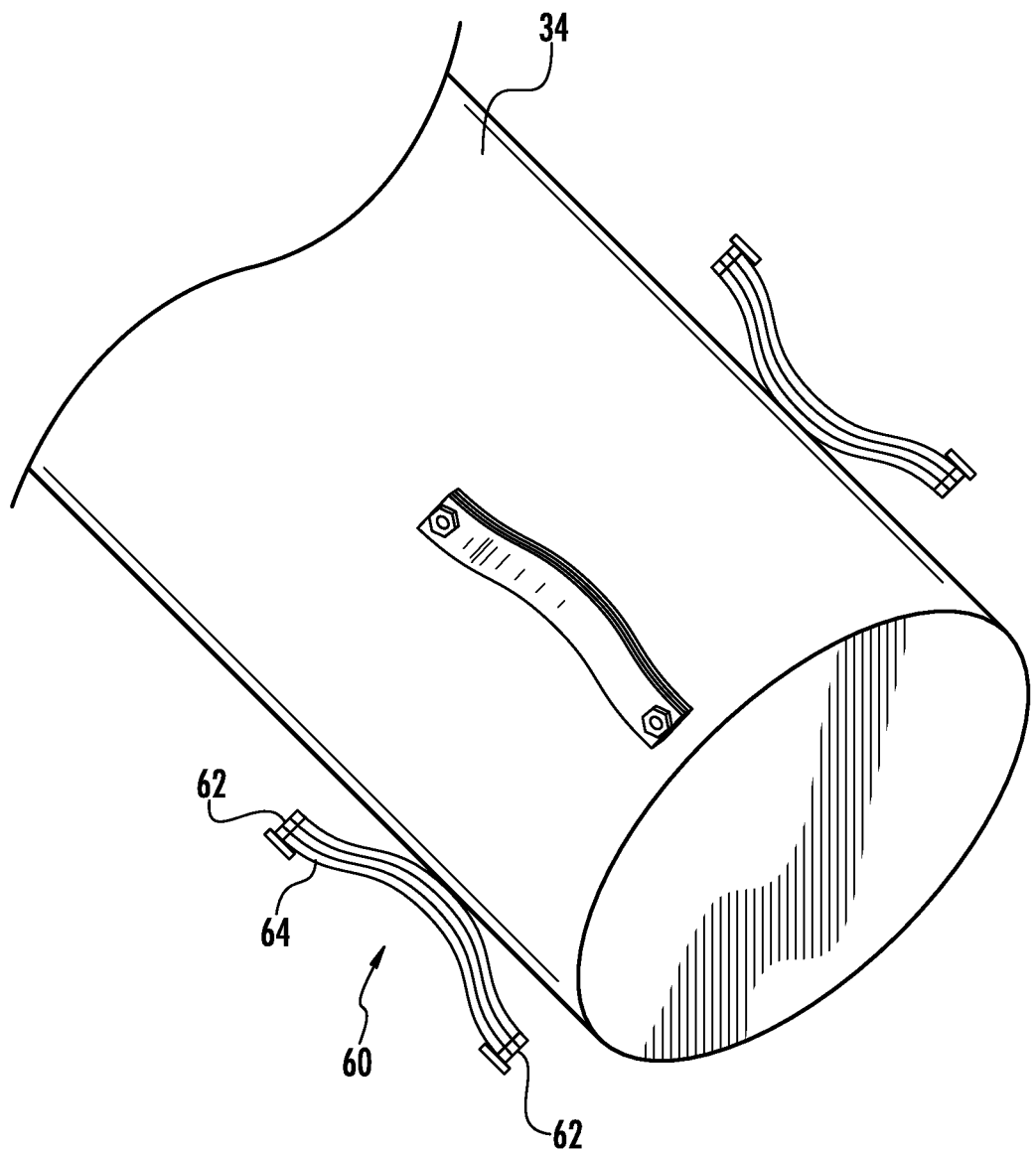
FIG. 4 is a perspective view of multiple leaf springs radially arranged around the shroud of the fuel nozzle shown in FIG. 3.

FIG. 3 provides an enlarged side cross-section view of the leaf springs 60 shown in FIG. 2, and FIG. 4 provides a perspective view of multiple leaf springs 60 radially arranged around the shroud 34 of the fuel nozzle 30. As shown more clearly in FIGS. 3 and 4, each leaf spring 60 may include one or more shackles 62 that connect three or more axially extending leaves 64 together to achieve the desired stiffness between the fuel nozzles 30 and the support 54. The shackles 62 generally prevent individual leaves 64 from straightening when compressed and may provide attachment points for bolting, welding, brazing, press-fitting, or otherwise connecting the leaf spring 60 to the support 54.

Figure 5:
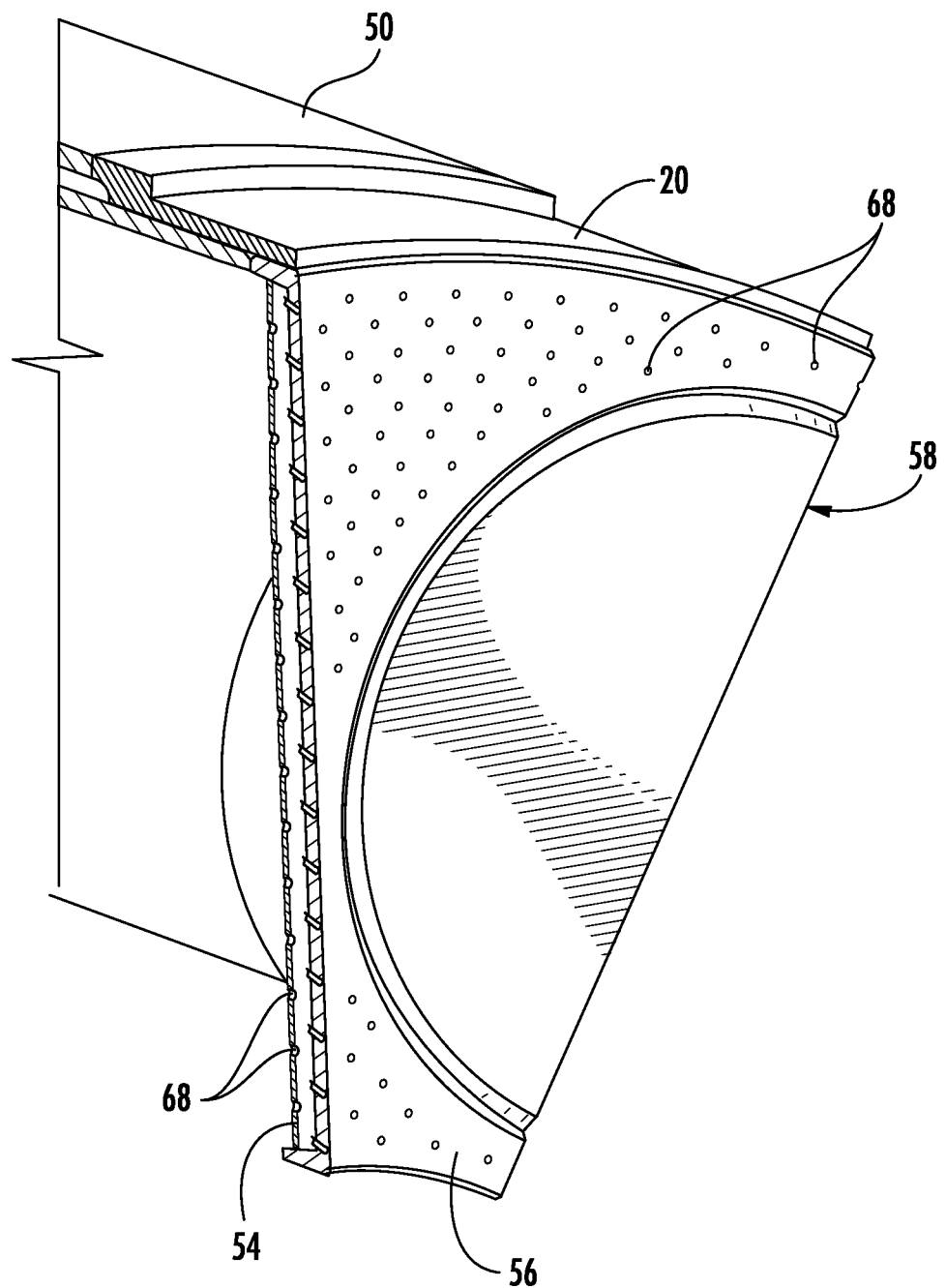
FIG. 5 is a perspective view of the cap assembly shown in FIG. 2.

FIG. 5 provides an upstream perspective view of the cap assembly 18 shown in FIG. 2. As shown, the support 54 and/or the cap plate 56 may include flow holes 68 therethrough to allow fluid flow through the respective support 54 and/or cap plate 56. In this manner, fluid flow through the support 54 may impinge on the cap plate 56 to provide impingement and/or convective cooling to the cap plate 56. Alternately or in addition, fluid flow through the cap plate 56 may provide effusion cooling to the downstream surface of the cap plate 56 facing the combustion chamber 22.

Figure 6:
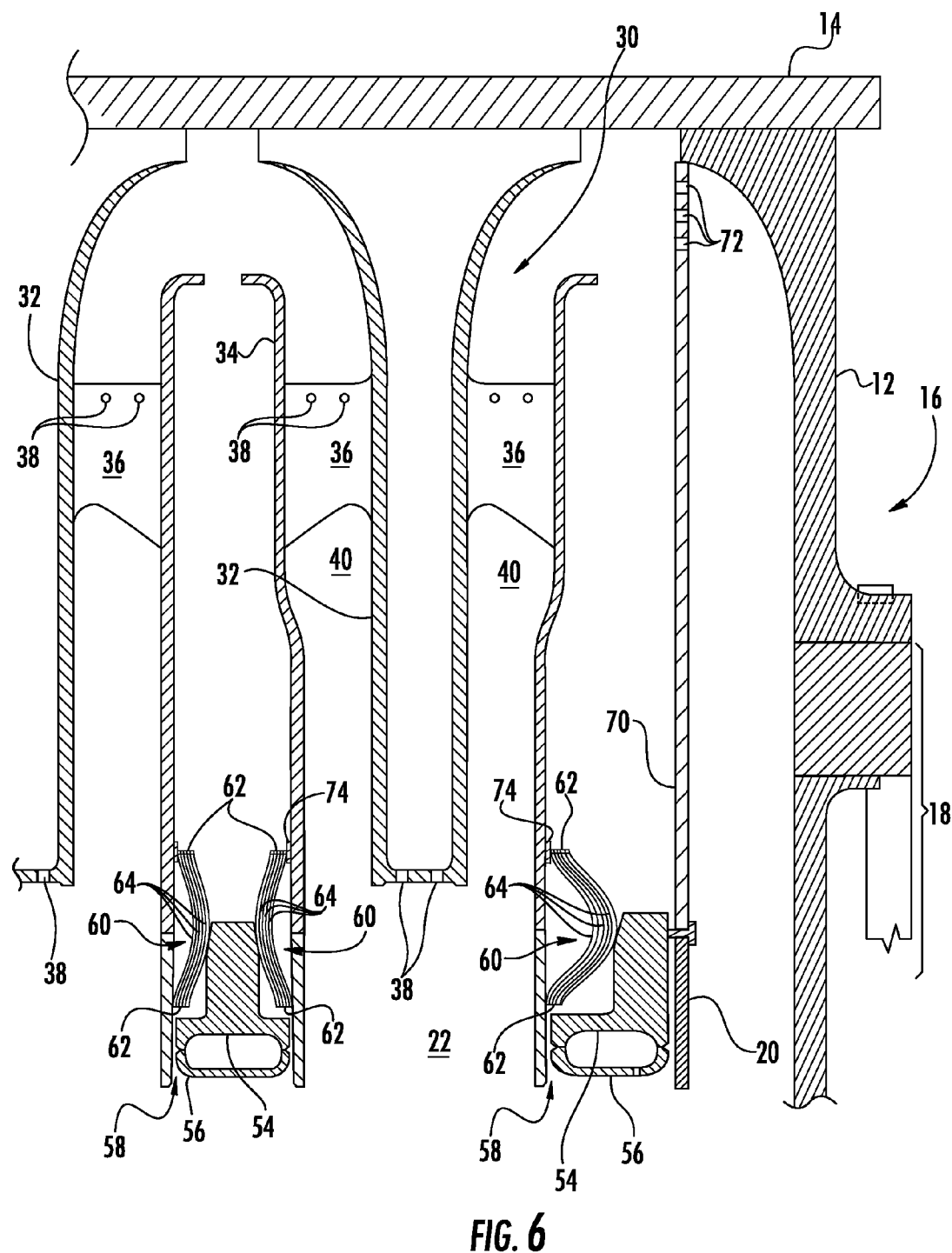
FIG. 6 is a side cross-section view of a portion of the head end of the combustor shown in FIG. 1 according to a second embodiment of the present invention.

FIG. 6 provides a side cross-section view of a portion of the head end 16 of the combustor 10 shown in FIG. 1 according to a second embodiment of the present invention. As shown in FIG. 6, each fuel nozzle 30 may again include the center body 32, shroud 34, vanes 36, fuel ports 38, and annular passage 40 as previously described with respect to FIG. 2. In addition, the cap assembly 18 again generally includes the support 54 and cap plate 56 as previously described. In this particular embodiment, a shroud 70 again circumferentially surrounds the fuel nozzles 30. As shown most clearly in FIG. 6, however, the radially extending braces 52 present in the previous embodiment have been removed, and the shroud 70 extends axially through the head end 16 and connects to the breech end 14 of the combustor 10. Perforations 72 in the shroud 70 allow the working fluid to flow across the shroud 70 and into the fuel nozzles 30, as before, while the breech end 14 rigidly supports the shroud 70 in place.

As shown in FIG. 6, one or more leaf springs 60 may again provide radial bracing between the fuel nozzles 30 and the support 54 to increase the natural or resonant frequencies of the fuel nozzles 30. In this particular embodiment, however, the leaf springs 60 are bolted, welded, brazed, press-fit, or otherwise attached to the shrouds 34 of the fuel nozzles 30.

Figure 7:
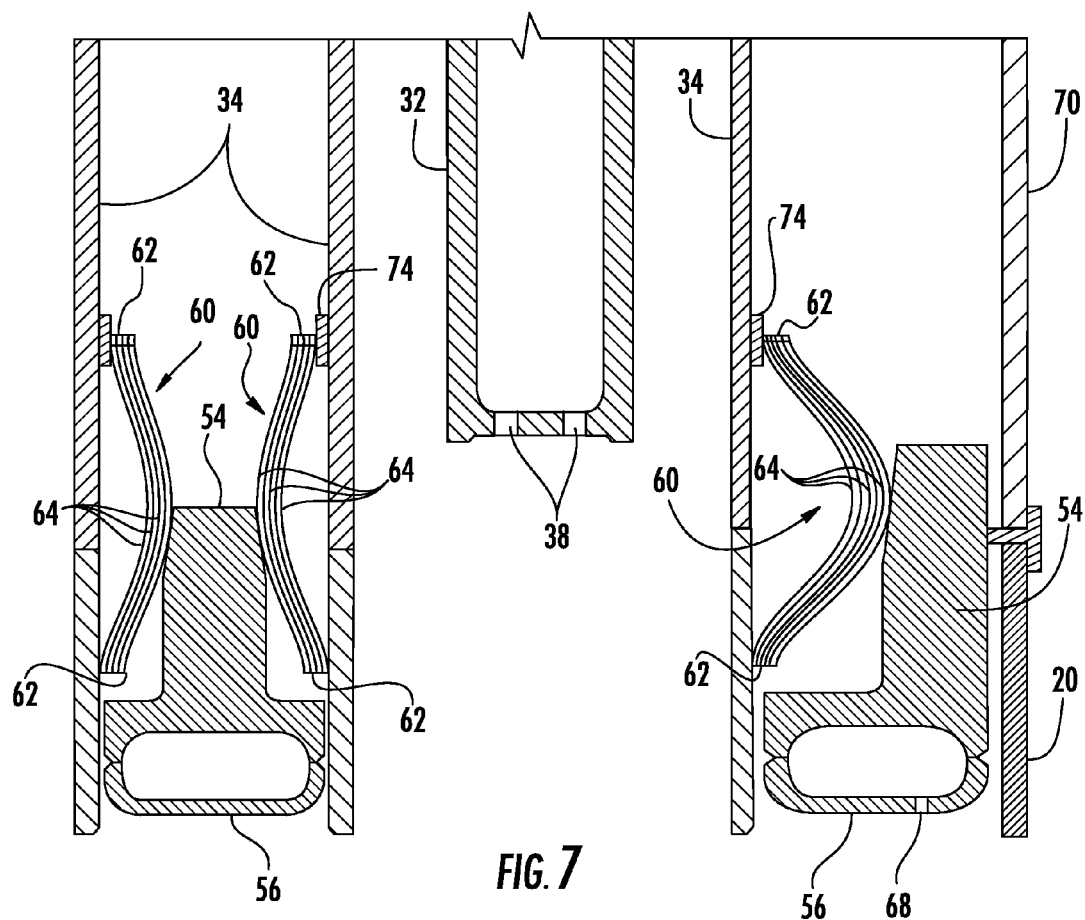
FIG. 7 is an enlarged side cross-section view of the leaf springs shown in FIG. 6.
Figure 8:
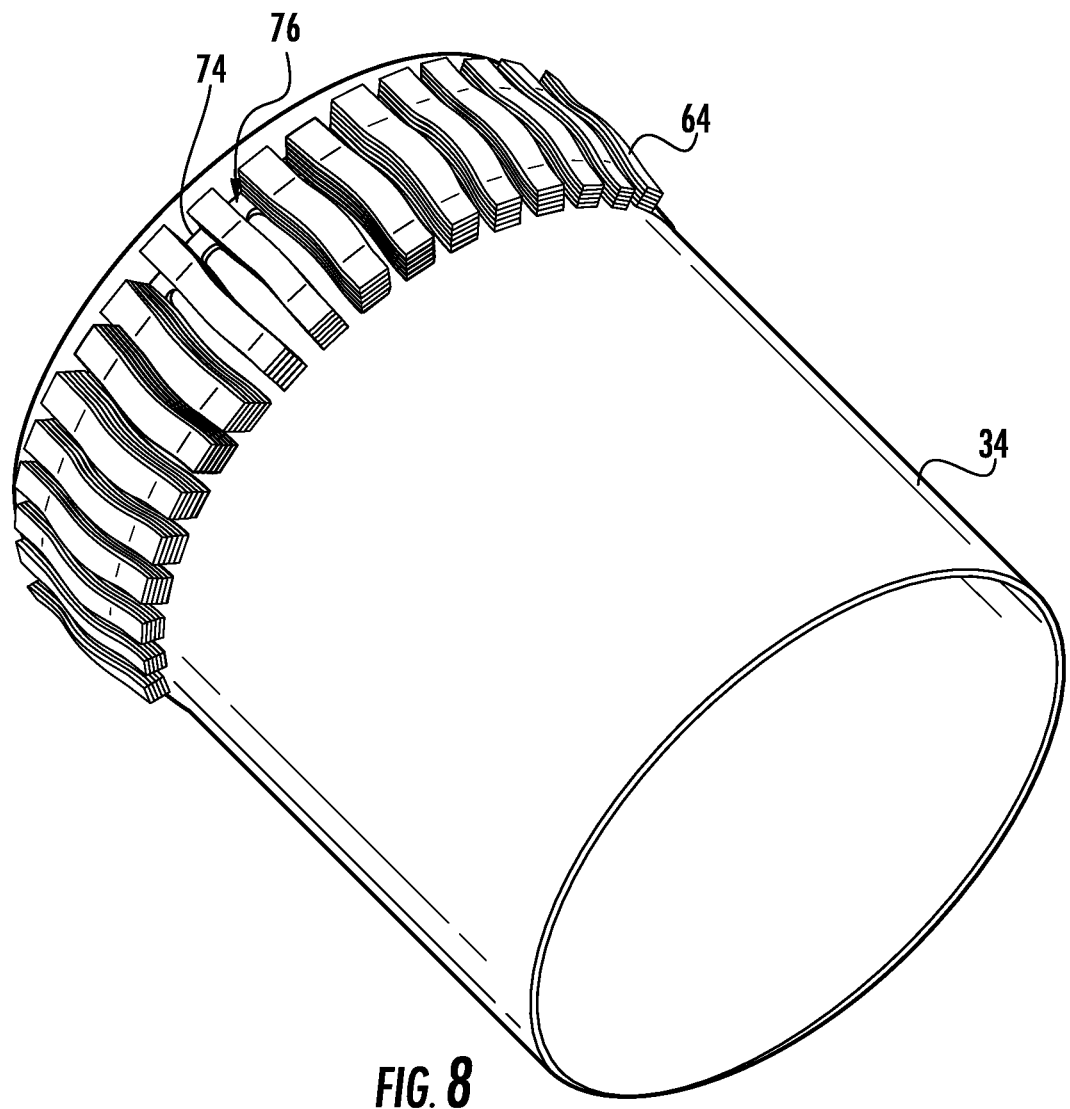
FIG. 8 is a perspective view of the hula spring shown in FIG. 7 radially arranged around the shroud of the fuel nozzle.

FIG. 7 provides an enlarged side cross-section view of the leaf springs 60 shown in FIG. 6, and FIG. 8 provides a perspective view of multiple leaf springs 60 radially arranged around the shroud 34 of the fuel nozzle 30. As shown more clearly in FIGS. 7 and 8, each leaf spring 60 may include at least five leaves 64, and an annular ring 74 may connect multiple leaf springs 60 together to form a hula spring 76 between the fuel nozzle 30 and the support 54. In this manner, the hula spring 76 may be bolted, welded, brazed, press-fit, or otherwise attached around one or more of the fuel nozzles 30, and the support 54 may be installed on top of the hula springs 74 so that the hula spring 76 radially braces the fuel nozzles 30 against the support 54.

As shown in FIGS. 6 and 7, the hula springs 76 flexibly brace the fuel nozzles 30 against the support 54. The support 54 in turn is rigidly connected to the shroud 70, and the shroud 70 extends axially through the head end 16 and connects to the breech end 14 of the combustor 10. As a result, the combined effect of the shroud 70, support 54, and hula springs 76 may stiffen the fuel nozzles 30 radially, thereby increasing the natural frequency of the fuel nozzles 30 and/or cap assembly 18. In addition, the location and orientation of the support 54 and hula springs 76 may facilitate assembly of the support 54 and hula springs 76 around the fuel nozzles 30. Specifically, the hula springs 76 may be bolted, welded, brazed, press-fit, or otherwise connected to the fuel nozzles 30, and the curvature of the leaf springs 60 may facilitate sliding the support 54 over the shrouds 34 to sandwich the hula springs 76 between the fuel nozzles 30 and the support 54. The support 54 may then be bolted, welded, brazed, press-fit, or otherwise attached to the shroud 70 before the cap plate 56 is similarly attached to complete installation of the cap assembly 18 in the combustor 10.

With respect to both of the embodiments shown in FIGS. 2-8, the temperature of the fuel and working fluid flowing around and through the combustor 10 may vary considerably during operations, causing the casing 12 and fuel nozzles 30 to expand or contract at different rates and by different amounts. It is anticipated that the flexibility in the support 54, leaf springs 60, and/or hula springs 76 will accommodate the axial movement between the casing 12, shrouds 50, 70, and fuel nozzles 30 caused by the thermal expansion and contraction between these components.

The embodiments shown and described with respect to FIGS. 2-8 may also provide a method for supporting the fuel nozzles 30 in the combustor 10 that may be implemented in existing or new combustors. The method may include, for example, connecting one or more leaf springs 60 and/or hula springs 76 to at least one of the fuel nozzle 30 or the support 54 that extends radially across at least a portion of the combustor 10. In addition, the method may include sliding the support 54 around the fuel nozzle 30 to sandwich the leaf springs 60 and/or hula springs 76 between the fuel nozzle 30 and the support 54. In particular embodiments, the method may further include connecting the support 54 to the shroud 50, 70 surrounding the fuel nozzle 30 and/or connecting the shroud 70 to the breech end 14 of the combustor 10.

The various embodiments shown and described with respect to FIGS. 2-8 provide one or more commercial and/or technical advantages over previous combustors. For example, the combined effect of the radial support provided by the support 54, leaf springs 60, and/or hula spring 74 may produce a higher resonant or natural frequency associated with the fuel nozzles 30 and/or cap assembly 18. The higher resonant or natural frequency allows for a larger head end 16 volume than previously provided without a corresponding increase in combustor dynamics. The larger head end 16 volume upstream from the combustion chamber 22 in turn allows more time for the fuel and working fluid to mix prior to combustion which allows for leaner and higher temperature combustion without increasing emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor comprising:
   a. a breech end;
   b. a plurality of fuel nozzles connected to the breech end and extending downstream from the breech end;
   c. a shroud that circumferentially surrounds the plurality of fuel nozzles inside the combustor;
   d. a support that extends radially inside at least a portion of the shroud; and
   e. a leaf spring between the support and one or more of the plurality of fuel nozzles, wherein each leaf spring includes at least three leaves stacked together and constrained between a pair of shackles disposed at opposing ends of the leaf spring, the pair of shackles disposed on an outer surface of the support.

2. The combustor as in claim 1, wherein the shroud is connected to the breech end of the combustor.

3. The combustor as in claim 1, further comprising a plurality of flow holes through the support around one or more of the plurality of fuel nozzles.

4. The combustor as in claim 1, wherein each leaf spring includes at least five leaves stacked together and constrained between the pair of shackles.

5. The combustor as in claim 1, wherein each leaf spring is fixedly connected to the support.

6. The combustor as in claim 1, further comprising a plurality of leaf springs between the support and one or more of the plurality of fuel nozzles.

7. The combustor as in claim 6, further comprising an annular ring connected to the plurality of leaf springs between the support and one or more of the plurality of fuel nozzles to form a hula spring between the support and one or more of the plurality of fuel nozzles.

8. A combustor comprising:
   a. a breech end;
   b. a cap assembly that extends radially across at least a portion of the combustor;
   c. a plurality of fuel nozzles connected to the breech end and extending downstream from the breech end through the cap assembly;
   d. a support that extends radially inside at least a portion of the cap assembly; and
   e. a leaf spring between the support and one or more of the plurality of fuel nozzles, wherein each leaf spring includes at least three leaves stacked together and constrained between a pair of shackles disposed at opposing ends of the leaf spring, the pair of shackles disposed on an outer surface of the support.

9. The combustor as in claim 8, wherein the cap assembly is connected to the breech end of the combustor.

10. The combustor as in claim 8, further comprising a plurality of flow holes through the support around one or more of the plurality of fuel nozzles.

11. The combustor as in claim 8, wherein each leaf spring includes at least five leaves stacked together and constrained between the pair of shackles.

12. The combustor as in claim 8, wherein each leaf spring is fixedly connected to the support.

13. The combustor as in claim 8, further comprising a plurality of leaf springs between the support and one or more of the plurality of fuel nozzles.

14. The combustor as in claim 13, further comprising an annular ring connected to the plurality of leaf springs between the support and one or more of the plurality of fuel nozzles to form a hula spring between the support and one or more of the plurality of fuel nozzles.

15. A combustor comprising:
   a. a breech end;
   b. a plurality of fuel nozzles connected to the breech end and extending downstream from the breech end;
   c. a shroud that circumferentially surrounds the plurality of fuel nozzles inside the combustor;
   d. a plate that extends radially across at least a portion of the combustor inside the shroud;
   e. a support that extends radially across at least a portion of the combustor inside the shroud and upstream from the plate; and
   f. a leaf spring between the support and one or more of the plurality of fuel nozzles, wherein each leaf spring includes at least three leaves stacked together and constrained between a pair of shackles disposed at opposing ends of the leaf spring, the pair of shackles disposed on an outer surface of the support.

16. The combustor as in claim 15, wherein the shroud is connected to the breech end of the combustor.

17. The combustor as in claim 15, further comprising a plurality of flow holes through the support around one or more of the plurality of fuel nozzles.

18. The combustor as in claim 15, wherein each leaf spring is fixedly connected to the support.

19. The combustor as in claim 15, further comprising a plurality of leaf springs between the support and one or more of the plurality of fuel nozzles.

20. The combustor as in claim 19, further comprising an annular ring connected to the plurality of leaf springs between the support and one or more of the plurality of fuel nozzles to form a hula spring between the support and one or more of the plurality of fuel nozzles.

* * * * *